United States Patent
Frait et al.

(10) Patent No.: US 9,593,761 B2
(45) Date of Patent: Mar. 14, 2017

(54) PNEUMATIC VENTING OF MODULAR HYBRID ELECTRIC VEHICLE

(71) Applicant: FORD GLOBAL TECHNOLOGIES, LLC, Dearborn, MI (US)

(72) Inventors: Steven A. Frait, Milan, MI (US); John E. Brevick, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 304 days.

(21) Appl. No.: 14/154,276

(22) Filed: Jan. 14, 2014

(65) Prior Publication Data

US 2014/0123807 A1    May 8, 2014

Related U.S. Application Data

(63) Continuation-in-part of application No. 13/362,018, filed on Jan. 31, 2012.

(51) Int. Cl.
*F16H 57/027*    (2012.01)
*B60K 6/405*    (2007.10)
*B60K 6/48*    (2007.10)

(52) U.S. Cl.
CPC .......... *F16H 57/027* (2013.01); *B60K 6/405* (2013.01); *B60K 6/48* (2013.01); *B60Y 2304/076* (2013.01); *B60Y 2400/426* (2013.01); *Y02T 10/6221* (2013.01); *Y10S 903/902* (2013.01); *Y10T 74/19014* (2015.01)

(58) Field of Classification Search
CPC .......... F16H 57/027; B60K 6/405; B60K 6/48
See application file for complete search history.

(56) References Cited

U.S. PATENT DOCUMENTS

| | | | | |
|---|---|---|---|---|
| 4,893,039 A | * | 1/1990 | Isii | B60S 1/16 310/88 |
| 6,386,067 B1 | * | 5/2002 | Inoue | F16H 45/02 74/730.1 |
| 7,679,238 B2 | | 3/2010 | Nomura et al. | |
| 8,899,397 B2 | * | 12/2014 | Ito | F16D 25/14 192/85.25 |
| 2007/0007095 A1 | | 1/2007 | Tsukamoto et al. | |
| 2008/0006635 A1 | * | 1/2008 | Bader | F16H 57/027 220/374 |
| 2008/0093135 A1 | | 4/2008 | Nomura et al. | |
| 2008/0099258 A1 | * | 5/2008 | Berhan | B60K 6/405 180/65.22 |
| 2009/0286649 A1 | * | 11/2009 | Sigmund | F16H 57/027 477/156 |
| 2010/0105518 A1 | | 4/2010 | Kasuya et al. | |
| 2010/0105519 A1 | | 4/2010 | Kasuya et al. | |
| 2011/0239818 A1 | | 10/2011 | Kasuya et al. | |
| 2011/0240430 A1 | | 10/2011 | Iwase et al. | |
| 2011/0240431 A1 | | 10/2011 | Iwase et al. | |
| 2012/0193187 A1 | * | 8/2012 | Osawa | B60K 6/40 192/85.17 |

(Continued)

*Primary Examiner* — Ha D Ho
(74) *Attorney, Agent, or Firm* — David B. Kelley; MacMillan, Sobanski & Todd, LLC

(57) ABSTRACT

A system for venting a hybrid electric powertrain includes a module defining a first volume containing a clutch and an electric machine, a housing defining a second volume containing an automatic transmission, and lines producing mutual pneumatic connections among the first volume, the second volume and ambient atmosphere.

9 Claims, 4 Drawing Sheets

(56) References Cited

U.S. PATENT DOCUMENTS

2012/0319514 A1\* 12/2012 Iwase ................. B60K 6/40
                                                       310/78
2013/0087225 A1\* 4/2013 Frait ................. F16H 45/00
                                                       137/560

\* cited by examiner

PNEUMATIC VENTING OF MODULAR HYBRID ELECTRIC VEHICLE

CROSS REFERENCE TO RELATED APPLICATIONS

This is a continuation-in-part application of pending U.S. application Ser. No. 13/362,018, filed Jan. 31, 2012.

BACKGROUND OF INVENTION

This invention relates to a powertrain for hybrid electric vehicles, particularly to a powertrain module that is located between and secured to an engine output and a transmission input.

Hybrid electric vehicles (HEVs) have both an internal combustion engine and an electric machine, which are alternately, or in combination, used to propel the vehicle. A variety of different powertrains are used in hybrid vehicles such as a parallel configuration, in which the engine is connected to the motor by a disconnect clutch with the motor driving a torque converter input of an automatic power transmission. The transmission has an output which is connected to a differential coupled to the two driven wheels of the vehicle.

A need exists in the industry for a hybrid electric powertrain that includes a modular subassembly for use with a variety of engines and transmissions, such that the module can be installed between and secured to an output of one of a number of engines and to an input of one of a number of transmissions. The assembled powertrain may then be employed in a variety of vehicles. The module should include a hydraulically actuated disconnect clutch, the electric machine and suitable power paths between the engine and electric machine to the transmission input. Preferably, the module provides for hydraulic communication from the transmission's hydraulic system to the clutch, a balance dam and the electric machine. The module must provide an oil sump containing hydraulic fluid delivered to the module, and a path for continually returning that fluid to the transmission's oil sump so that the transmission pump is continually supplied reliably with fluid.

Modular hybrid transmissions (MHT) includes a module containing the disconnect clutch and electric machine in a housing that is bolted between the engine and transmission. This housing, sometimes called a front module (FM) since it is part of the MHT and is bolted in front of the transmission, is supplied with oil from the transmission line pressure circuit and the lube circuit. This oil will drain to the bottom of the FM and then back to the transmission. It is possible that cold temperatures, grades and high flow rates will result in oil filling the drain back passage

SUMMARY OF INVENTION

A system for venting a hybrid electric powertrain includes a module defining a first volume containing a clutch and an electric machine, a housing defining a second volume containing an automatic transmission, and lines producing mutual pneumatic connections among the first volume, the second volume and ambient atmosphere.

The venting system connects the two vent lines together to ensure that no differential pressure between the front module and transmission housing and to provide proper drain back of transmission fluid from the module to the transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

The invention will be more readily understood by reference to the following description, taken with the accompanying drawings, in which.

DETAILED DESCRIPTION

Figure 1A:
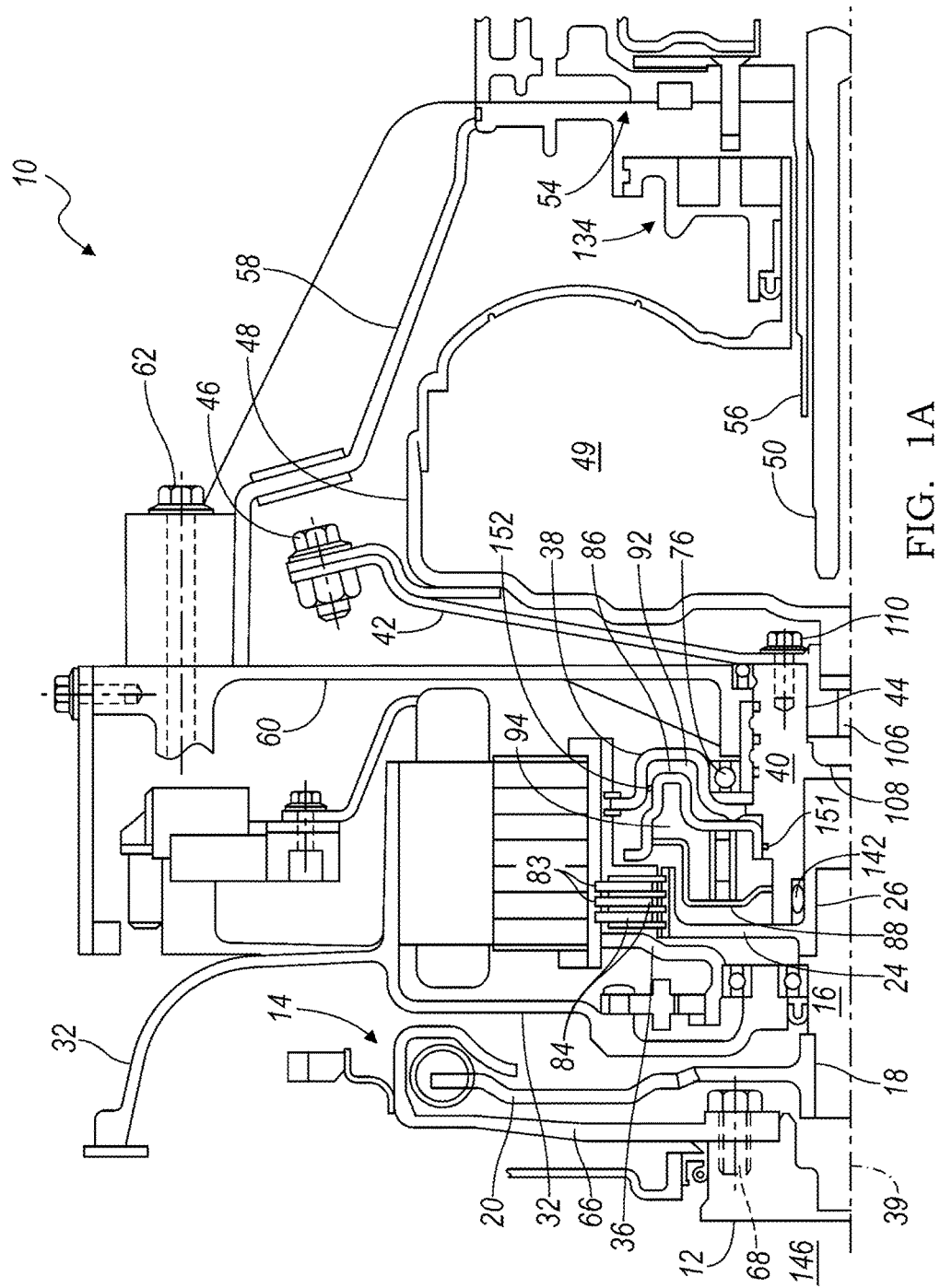
FIGS. 1A and 1B comprise a side cross-sectional view of a powertrain module showing a front connection to an engine output and a rear connection to a transmission torque converter input.
Figure 1B:
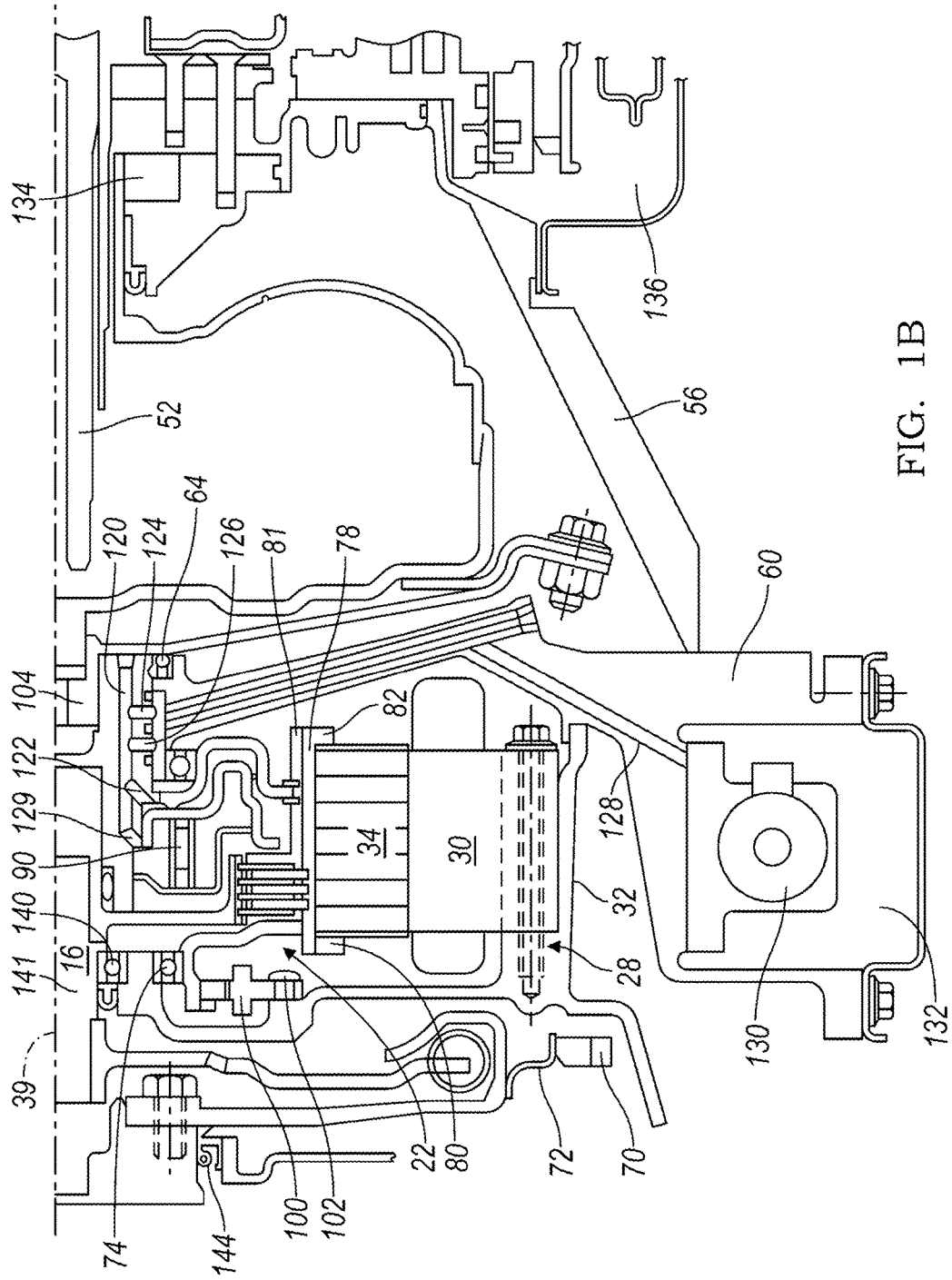

FIGS. 1A and 1B illustrate a front module 10 of a powertrain for a hybrid electric vehicle that includes an engine having a rotary output 12; a torsional damper 14, secured to the engine output 12; an input shaft 16, secured by a spline 18 to an output 20 of damper 14; a disconnect clutch 22, supported on a clutch hub 24 that is secured by a spline 26 to input shaft 16; an electric machine 28, which includes a stator 30 bolted to a front bulkhead 32 and a rotor 34 supported by a first leg 36 and a second leg 38 for rotation about an axis 39; a rotor hub 40, secured preferably by a weld to leg 38; and a flexplate 42, secured at one end by a spline connection 44 or by bolts 110 to rotor hub 40 and secured at the opposite end by bolts 46 to a torque converter casing 48, which encloses a hydrokinetic torque converter 49. The electric machine 28 may be an electric motor or an electric motor-generator.

Module 10, which is enclosed by a front bulkhead 32 and a rear bulkhead 60 and various hydraulic seals, contains a wet volume supplied with automatic transmission fluid for actuating disconnect clutch 22, lubricating and cooling the clutch 22 and the electric machine 28. Similarly the automatic transmission 54 enclosed by housing 58 contains a wet volume containing automatic transmission fluid for actuating the transmission's clutch and brakes, lubricating and cooling the clutch and brakes, bearings, shafts, gears, etc. located in housing 58. Hydraulic fluid is supplied to module 10 from the transmission 58 and is returned from the module to the transmission sump within housing 58.

Torque converters suitable for use in the powertrain are disclosed in and described with reference to FIGS. 4a, 4b, 5, 12 and 15 of U.S. patent application Ser. No. 13/325,101, filed Dec. 14, 2011, the entire disclosure of which is herein incorporated by reference.

The torque converter 49 includes a bladed impeller wheel located within and secured to casing 48; a bladed turbine, driven hydrokinetically by the impeller and secured by a spline 50 to the input shaft 52 of an automatic transmission 54; and a bladed stator wheel, located between the turbine and stator and secured to a stator shaft 56, which is held against rotation on a transmission housing 58.

A rear bulkhead 60, secured by bolts 62 to the transmission housing 58, is fitted at its radial inner surface with a hydraulic seal 64, which contacts the radial outer surface of rotor hub 40.

A flywheel 66, secured by bolts 68 to the engine's rotary output 12, carries an engine starting gear 70, which is secured by a disc 72, welded to the starting gear and flywheel.

A bearing 74 supports the first leg 36 for rotation on the front bulkhead 32. A bearing 76 supports the second leg 38 for rotation on the rotor hub 40. A tube 78, aligned with axis 39 and supporting the rotor 34 for rotation about the axis, is secured to the first leg 36 and second leg 38. Lips 80, 82 at the front and rear ends, respectively, of tube 78 may be rolled radially outward to secure the rotor 34 to tube 78 and to prevent axial displacement of the rotor 34 relative to the tube. The inner surface of tube 78 is formed with an axial spline 81, which is engaged by the legs 36, 38 and alternate plates 83 of the disconnect clutch 22. The friction plates 84 of clutch 22 are secured by an axial spline formed on the radial outer surface of clutch hub 24.

A hydraulic servo for actuating clutch 22 includes a piston 86, balance dam 88, return spring 90 and hydraulic lines for transmitting actuating pressure to the pressure control volume 92 at the right hand side of piston 86 and to the pressure balance volume 94 at the left hand side of the piston. Piston 86 moves leftward in a cylinder formed by the rear leg 38 when actuating pressure and hydraulic fluid is supplied to volume 92, by the use of seals 151 and 152, thereby causing clutch 22 to engage and driveably connect rotor 34 and the engine output 12 through damper 14, input shaft 16, clutch hub 24 and clutch 22.

Because the piston 86, balance dam 88 and return spring 90 are supported on the rotor hub 40, rotational inertia of the piston 86, balance dam 88 and return spring 90 is located on the output side, i.e., the rotor side of clutch 22.

Rotor 34 is continually driveably connected to the transmission input shaft 52 through the torque path that includes rear leg 38, rotor hub 40, flexplate 42, torque converter casing 48, the hydrodynamic drive connection between the torque converter impeller and turbine, which is connected by spline 50 to transmission input shaft 52.

A resolver 100, a highly accurate type of rotary electrical transformer used for measuring degrees of rotation, is secured by bolts 102 to the front bulkhead 32, is supported on the front bulkhead 32 and first leg, and is located axially between the front bulkhead 32 and rear bulkhead 60.

The teeth of spline 44, which produces a rotary drive connection between flexplate 42 and rotor hub 40, are fitted together such that no lash is produced when torque is transmitted between the flexplate and rotor hub. Flexplate 42 is formed with a thick walled portion 104 having a threaded hole 106 that terminate at a web 108. The external spline teeth on flexplate 42 are forced axially into engagement with the internal spline teeth on rotor hub 40 by bolts 110, which engage threaded holes in the right-hand end of rotor hub 40. The engaged spline teeth at the spline connection 44 are disengaged upon removing bolts 110 and threading a larger bolt into hole 106 such that the bolt contacts web, thereby forcing flexplate axial rightward.

Rotor hub 40 is formed with multiple axially-directed hydraulic passages 120 and laterally-directed passages 120, 122, 124, 126, 128, 129, which carry hydraulic fluid and pressure to module 10 from the hydraulic system of the transmission 54. Passages 122, 124, 126, 128, 129 carry hydraulic fluid and pressure which includes to the control volume 92 of the servo of clutch 22 located at the right hand side of piston 86, to the pressure balance volume 94 between balance dam 88 and the piston, to a variable force solenoid (VFS) 130, and to the surfaces of rotor 34 and stator 30, which surfaces are cooled by the fluid. The rear bulkhead 60 is formed with passage 128, which communicates hydraulically with VFS 130.

The rear bulkhead 60 supports a sump 132, which contains fluid supplied to module 10 from the hydraulic system of the transmission 54. Transmission 54 includes a sump 136, which contains hydraulic fluid that is supplied by a transmission pump 134 to the transmission hydraulic system, from which fluid and control pressure is supplied to module 10, torque converter 49, transmission clutches and brakes, bearings, shafts, gears, etc.

A bearing 140, fitted in the front bulkhead 32, and a bearing 142, fitted in the rotor hub 40, support input shaft 16 in rotation about axis 39. The front bulkhead 32 also supports the stator 30 in its proper axial and radial positions relative to the rotor 34. Bearing 76, fitted between rear bulkhead 60 and rotor hub 40, and bearing 142 support rotor hub 40 in rotation about axis 39. The front and rear bulkheads 32, 60 together support rotor 34 in rotation about axis 39 due to bearing 74, fitted in bulkhead 32, and bearing 76, fitted in bulkhead 60.

Seal 64, fitted in the rear bulkhead 60, and seal 141, fitted in the front bulkhead 32, prevent passage of fluid from module 10 located between the bulkheads 32, 60. Another dynamic seal 144 prevents passage of contaminants between the engine compartment 146 and module 10.

The components of module 10 are installed and assembled in the module. The assembled module can then be installed between and connected to the engine output 12 and the torque converter casing 48.

In operation, when the engine output 12 is driven by an engine, torque is transmitted from the engine through rotor hub 40 and flexplate 42 to the torque converter casing 48, provided that clutch 22 is engaged. The rotor 34 electric machine 28 is continually driveably connected through tube 78, leg 38, rotor hub 40 and flexplate 42 to the torque converter casing 48. Therefore, the torque converter casing 48 can be driven by the engine alone, provided the electric machine 28 is off and clutch 22 is engaged; by the electric machine alone, provided the engine is off or the engine in operating and the clutch is disengaged; and by both the engine and electric machine concurrently.

Figure 2:
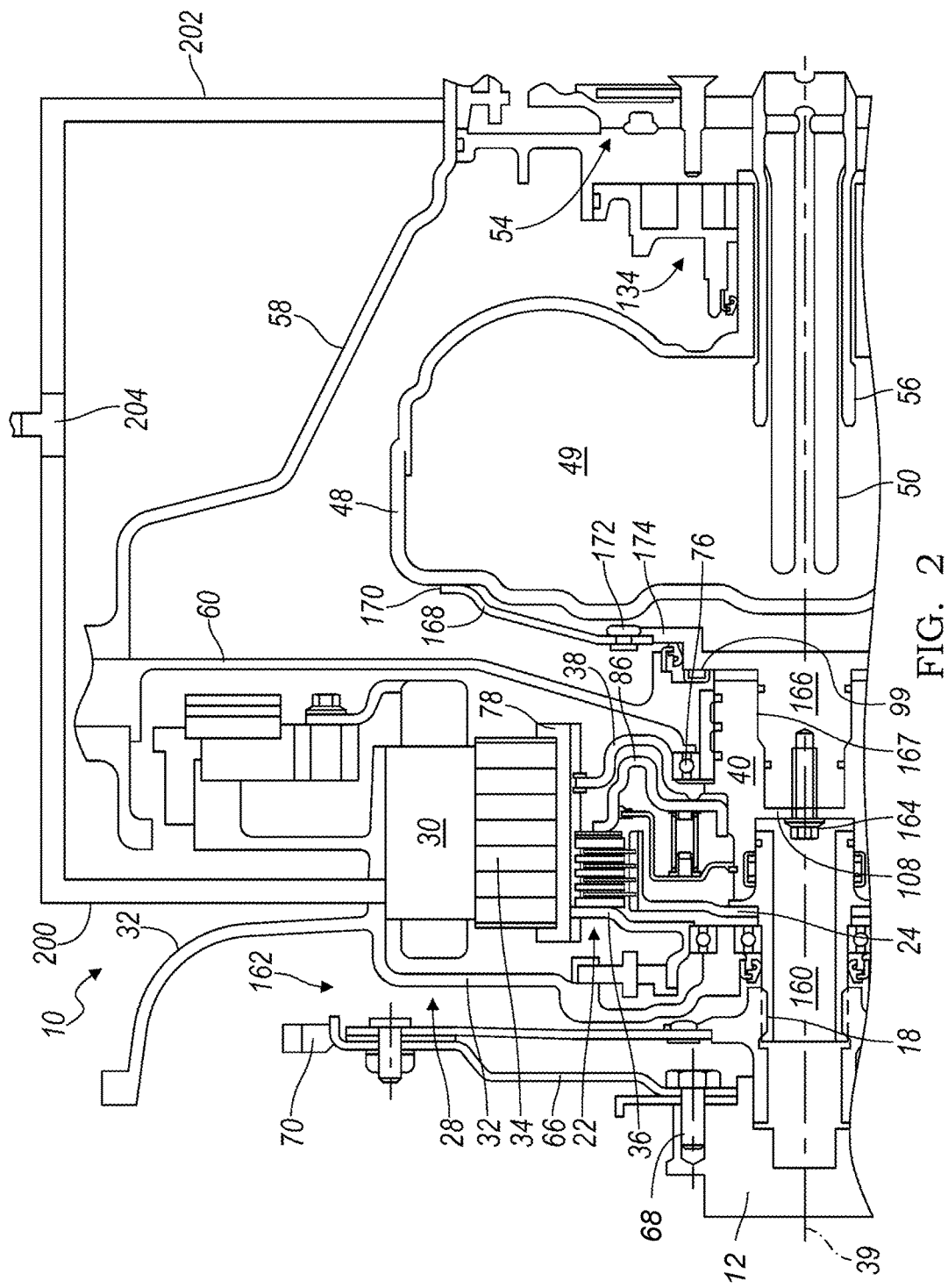
FIG. 2 is side cross-sectional view of the powertrain of FIG. 1 showing a torque converter having a bolted, integrated flex plate.

In FIG. 2, input shaft 160 is driveably connected to the engine output 12 through flywheel 66, damper 162 and spline 18. A bolt 164, installed through the front side of the front module, is inserted through a bore in input shaft 160 and through a web 108 of rotor hub 40. Bolt 164 is treaded into a tapped bore formed at the front side of a coupler shaft 166, thereby providing axial force continuity between rotor hub 40 and coupler shaft 166. Coupler shaft 166 is connected for rotation with rotor hub 40 through a spline connection 167, which includes mutually engaged axial spline teeth formed on an inner radial surface of rotor hub 40 and axial spline teeth formed on the external radial surface of coupler shaft 166.

A flex plate 168 is secured, preferably by a weld 170, to the torque converter casing 48 and by a series of rivets 172 to a flange 174 of coupler shaft 166, thereby securing rotor hub 40 to torque converter casing 48. Bolt 164 secures torque converter 49 to the front module 10 and carries axial load between the torque converter 49 and module 10 by use of the thrust bearing 99.

Figure 3:
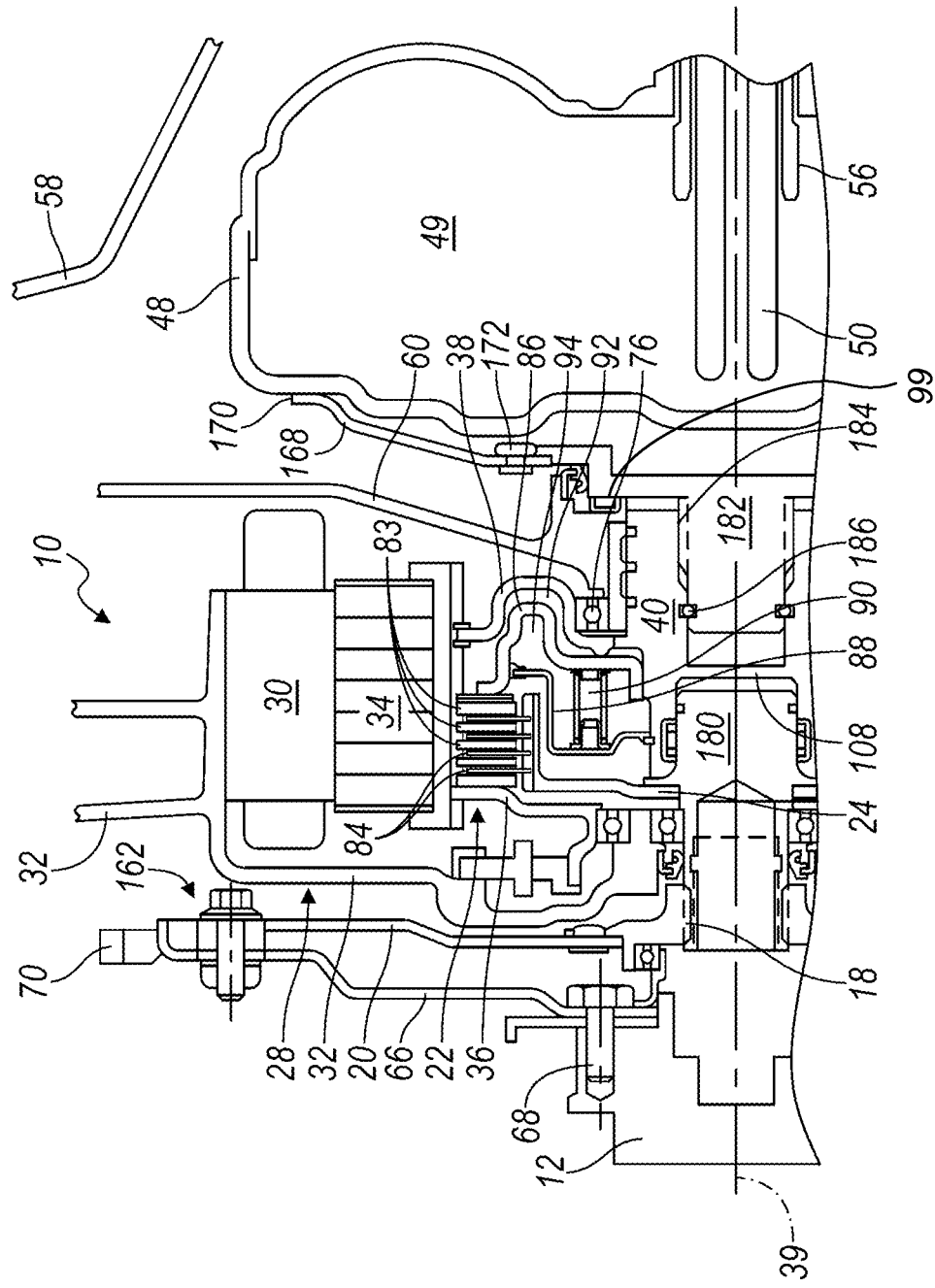
FIG. 3 is side cross-sectional view of the powertrain of FIG. 1 showing a torque converter having an elastically coupled integrated flex plate.

In FIG. 3, input shaft 180 is driveably connected to the engine output 12 through flywheel 66, damper 162 and spline 18. A flex plate 168 is secured, preferably by a weld 170, to the torque converter casing 48 and by a series of rivets 172 to a flange 174 of coupler shaft 182, thereby securing rotor hub 40 to torque converter casing 48.

Coupler shaft 182 is connected for rotation to rotor hub 40 through a spline connection 184, which includes mutually engaged axial spline teeth formed on an inner radial surface of rotor hub 40 and axial spline teeth formed on the external radial surface of coupler shaft 182.

Rotor hub 40 is formed with an annular recess located at a radial inner surface of a bore in the rotor hub. Similarly, coupler shaft 182 is formed with an annular recess located at a radial outer surface and aligned axially with recess of rotor hub 40. A C-clip 186 mutually engages the recess of rotor hub 40 and coupler shaft 182, thereby securing torque converter 49 to the front module 10 and carrying axial load between the torque converter 49 and module 10 by use of the thrust bearing 99.

Venting the automatic transmission 54 and the front module 10 to the atmosphere can result in a differential pressure between the transmission housing 58 and front module due to vent behavior and performance. As FIG. 2 illustrates, to avoid this possibility a first vent line 200, which communicates with the interior of front module 10 through the front bulkhead 32, and a second vent line 202, which communicates with the interior of transmission 54 through the transmission housing 58, are joined at a tee connection 204 such that lines 200, 202 communicate mutually and to the ambient atmosphere. This venting arrangement pneumatically connects the two vent lines 200, 202, thereby preventing development of differential pressure between module 10 and the transmission housing 54 and ensuring proper drain back for transmission fluid from the module to the transmission.

Although use of tubular vent lines 200, 202 has been described, the required pneumatic communication among the interior of module 10, the interior of transmission housing 58 and the ambient atmosphere can also be accomplished using cast or drilled passage(s) in the bell housing 58, which contains torque converter 49 and its casing 48.

In accordance with the provisions of the patent statutes, the preferred embodiment has been described. However, it should be noted that the alternate embodiments can be practiced otherwise than as specifically illustrated and described.

What is claimed is:

1. A system for venting a hybrid electric powertrain, comprising:
a module defining a first volume containing a clutch and an electric machine;
a housing defining a second volume containing an automatic transmission;
pneumatic connections pneumatically connecting the first volume to the second volume and the first and second volumes to ambient atmosphere; and
wherein a transmission sump is mounted to the housing, a transmission pump is configured to pump hydraulic fluid from the transmission sump to the module, the module is hydraulically sealed and supplied with hydraulic fluid under pressure from the transmission pump for actuating the clutch, with hydraulic fluid draining from the module into a sump in the module.

2. The system of claim 1, wherein the module further comprises:
a front bulkhead located between the first volume and an engine output; and
a rear bulkhead located between the first volume and a torque converter.

3. The system of claim 1, wherein the pneumatic connections further comprise:
a first tubular line pneumatically connected to the first volume;
a second tubular line pneumatically connected to the second volume;
a tee fitting pneumatically interconnecting the ambient atmosphere, the first tubular line and the second tubular line.

4. The system of claim 1, wherein hydraulic fluid from the sump in the module is returned to the transmission sump of the housing.

5. A system for venting a hybrid electric powertrain, comprising:
a module defining a first volume containing an electric machine rotor, a rotor hub, a clutch hub driveably connected to an engine, a clutch for releaseably connecting the engine and the rotor, and a sump;
a housing defining a second volume containing an automatic transmission;
a transmission sump mounted to the housing;
pneumatic connections among the first volume, the second volume and ambient atmosphere; and
wherein a transmission pump is configured to pump hydraulic fluid from the transmission sump to the module, the module is hydraulically sealed and supplied with hydraulic fluid under pressure from the transmission pump for actuating the clutch, with hydraulic fluid draining from the module into the sump in the module.

6. The system of claim 5, wherein the module further comprises:
a front bulkhead located between the first volume and an engine output; and
a rear bulkhead located between the first volume and a torque converter.

7. The system of claim 5, wherein the pneumatic connections further comprise:
a first tubular line pneumatically connected to the first volume;
a second tubular line pneumatically connected to the second volume;
a tee fitting pneumatically interconnecting the ambient atmosphere to the first tubular line and the second tubular line, and the first and second tubular lines pneumatically connecting the first volume to the second volume.

8. The system of claim 5, wherein hydraulic fluid from the sump in the module is returned to the transmission sump of the housing.

9. A system for venting a hybrid electric powertrain, comprising:
a module defining a first volume containing an electric machine, a clutch, and a sump;
a housing defining a second volume containing an automatic transmission;
a transmission sump mounted to the housing; and
pneumatic connections among the first volume, the second volume and ambient atmosphere, wherein hydraulic fluid from the sump in the module is returned to the transmission sump.

* * * * *